Oct. 17, 1961     C. A. NIELSON     3,004,535
OPTICAL INSERT FOR GAS MASKS
Filed March 1, 1960
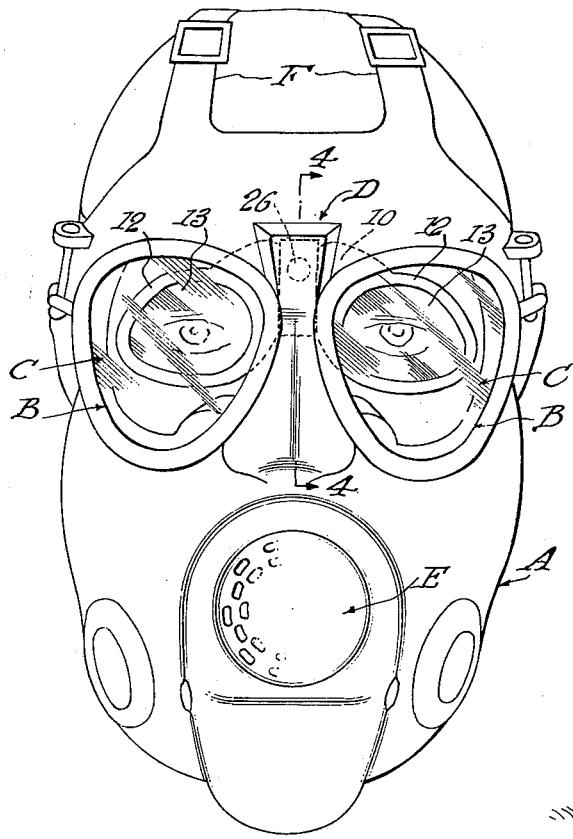
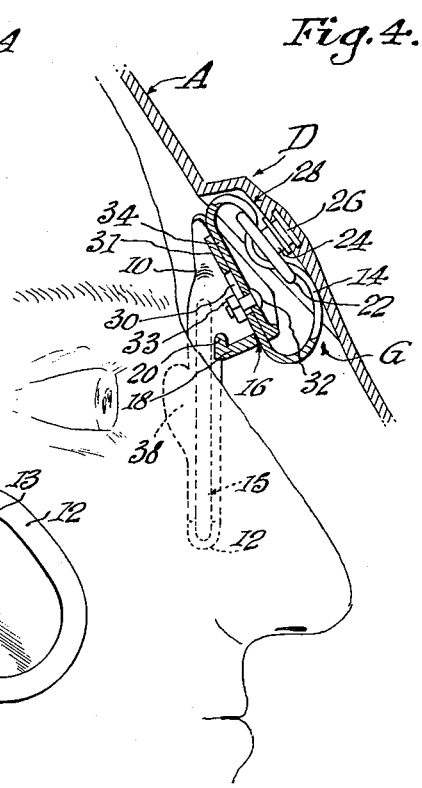
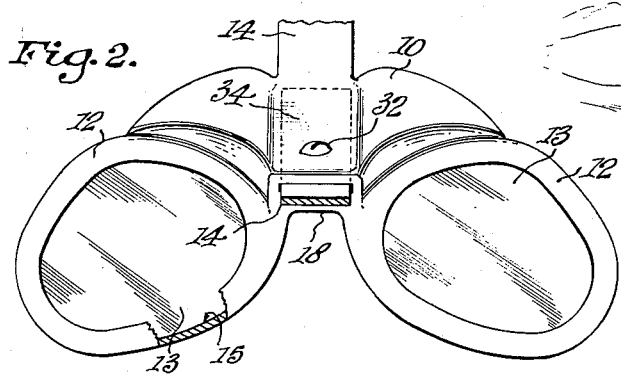
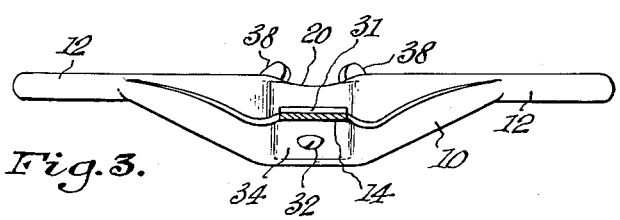
INVENTOR.
Carl A. Nielson
ATTORNEYS

United States Patent Office 3,004,535
Patented Oct. 17, 1961

3,004,535
OPTICAL INSERT FOR GAS MASKS
Carl A. Nielson, Takoma Park, Md., assignor to the United States of America as represented by the Secretary of the Army
Filed Mar. 1, 1960, Ser. No. 12,238
2 Claims. (Cl. 128—141)
(Granted under Title 35, U.S. Code (1952), sec. 266)

The invention described and illustrated herein may be manufactured and used by or for the Government for governmental purposes without the payment of any royalty thereon.

The instant invention relates to improved types of gas masks and especially such masks that are employed for military purposes, the invention relating particularly to means employed in such gas masks for the mounting of inserts therein which carry prescription lenses for correction of ophthalmic defects while the mask is being worn.

From the inherent nature of their use, and particularly in the case of military gas masks, such are designed and are required to fit snugly to the face of the wearer for preventing ingress of toxic materials. It, therefore, is very difficult for a person wearing prescription or special glasses to adjust the mask to his face to achieve the proper fit. Therefore, various means are employed for adapting an ophthalmic gas mask to correct the vision of the wearer. One of these means which has met with some success is the provision of clip inserts containing the prescription lenses and adapted to fit in the inside of the face piece behind the windows of the mask and in alignment with the eyes of the wearer. However, when the prescription lenses are positioned within the face piece, they tend to become fogged and to interfere with the vision of the wearer. Also, these clip inserts are only practical in gas masks having relatively small windows therein. When very large windows are employed, and especially large windows which cut across normal lines of vision at oblique angles, there is great difficulty in mounting the prescription lenses within the face piece so that they will be in correct optical relation to the eyes of the wearer.

Practically all gas masks are constructed of a flexible inert material such as rubber so that they can be adjusted to faces of different widths. The face piece generally is of a face-conforming strap that is rounded or V-shaped with a window on each side thereof separated by a central nose strip of the flexible material. This provides for the flexing of the mask along a longitudinal line between the windows for adjusting the width of the mask. However, this means of adjusting the width of the mask is objectionable when it is desired to adapt such mask to carry prescription lenses for the correction of the vision of the wearer of the mask. The various types of fixed mountings for prescription lenses which have been provided heretofore frequently are turned out of proper alignment when the mask is used by a person having an unusually wide or narrow face. Furthermore, for good visibility, the prescription lenses must be close to the eyes of the wearer, whereas the windows in gas masks are frequently at a considerably greater distance from the eyes of the wearer than the optimum distance for prescription lenses.

Because of recently, substantially increased widespread use of gas masks for military and industrial use such as in atomic energy plants, the problem of designing optical gas masks has taken a new turn. Thus, it has been found that it is necessary to decontaminate the gas masks worn in atomic energy plants at intervals of at least once per day and, therefore, it is necessary to make provision for the convenient removal of the prescription lenses from one mask and their insertion in a different mask. In other words, it is desired to supply the worker requiring corrected vision with a pair of optical gas mask lenses that can be inserted in any of the masks in use in the plant without changing the optical relation of the lenses to the eyes of the wearer.

Present customary constructions of optical gas masks for military personnel requiring prescription glasses for visual corrections comprise the inclusion in the gas mask constructions of a lens-mounting assembly, including a lens wire and supporting frame attached to peripheral elements of the lens enclosures of the mask, generally similar to the disclosure of United States Patent No. 2,388,713, issued November 13, 1945 to Nathan R. Schutz and Jack Dubitsky.

The use of such assembly, including a lens wire and supporting frame insert, results in certain definite disadvantages, among which may be noted: (1) The shape of it constricts the peripheral vision vital to personnel in combat, causing an individual to turn his head to see that which he should be able to see by movement of the eyes alone; (2) The present inserts are too easily put out of adjustment by inserts touching each other when the mask is folded, lenses also becoming scratched because of such contacts, and the lens frames themselves becoming bent and distorted very easily; (3) The lenses are rotatable within their frames due to their circular construction; (4) Fitting and adjusting times become excessive because a number of inserts must be tried before correct ones can be found which match the interpupillary distances, and in cases where cylinders must be fitted, alignment of cylindrical axis has to be made; (5) No adjustment is possible for vertex depth or panascopic tilt; (6) It is necessary to carry excessively large stocks of these inserts to meet even ordinary requirements; (7) The position of these inserts relative to the eyes is too dependent upon the positioning of the mask on the face of the wearer, and spectacles unoriented with respect to their prescribed individual relationship are annoying if not ineffectual; (8) The possibility of incurring injury from them is present; (9) Any misalignment of the lenses contributes to double vision.

In view of the foregoing, and other disadvantages and objections accruing to the use of the inserts comprising a lens wire and supporting frame as used in the customary mask constructions, it has been considered to be highly desirable to eliminate from the newly improved gas mask constructions attachments and encumbrances from the prescription lenses to be incorporated in the improved gas mask construction, such elimination meaning, however, a departure from the present method of fitting lenses by means of the lens wire and supporting frame attached to peripheral elements of the lens enclosure.

From the foregoing, it may be considered that one object of the instant invention is to provide an optical insert for attachment to, and to be within the confines of, improved, present-day military gas mask constructions, which will not interfere with the performance thereof, and which will enable the fitting of prescription lenses as may be required to individual military personnel in accordance with accepted scientific methods and standards.

A further object of the invention is the development of a flexible elastomeric lens frame along the lines of conventional spectacles so as to leave the prescription lenses more independent of the movements of the mask and its position on the face than is obtained with the current method.

Further objects and advantages of the instant improved optical insert will become apparent as the description proceeds, and the features of novelty will be pointed out in particularity in the appended claims.

The construction of the present invention will be understood more readily by reference to the accompanying drawings, in which:

FIG. 1 is a front view of a presently-employed improved gas mask which includes the improved ophthalmologic insert of the present invention for the effective mounting of prescription eye-glass lenses with respect to the eyes of the individual user, as well as with respect to the improved type of military gas mask as presently employed.

FIG. 2 is a front elevational view of the ophthalmic insert shown in FIG. 1;

FIG. 3 is a plan view of the insert of FIG. 2; and

FIG. 4 is a fragmentary sectional view of the insert of FIG. 1, the view being taken along the line 4—4 of FIG. 1, looking in the direction of the arrows.

Detailed reference now may be had to the accompanying drawings, which illustrate an embodiment of the instant invention which fulfills the foregoing requirements and conditions. In the illustrated embodiment of the present invention, reference A represents a presently-employed type of military gas mask shown in hermetically-sealing protective position, the mask having windows B fitted with glass seals C, a nosepiece D, and a respiratory element E. The mask A has attachment straps F, and it is adapted to form a substantially hermetic seal with the face of a wearer, except for the opening provided for ingress and egress of air through respiratory element E.

The mask A normally is positioned frontally with respect to the face of a wearer, and provides space G which is adequate for the reception and mounting of an optical insert in which are embodied the novel features of the instant invention.

The optical insert is a flexible elastomeric assembly which has a flexibility similar to the mask A, and it may be either a plasticized synthetic resin elastomer, for example, such an elastomer having a vinyl resin base, or preferably, it is composed of a natural rubber having a softness and flexibility comparable to that of the mask A for facilitating folding, unpacking and quick adjustability with respect to wearing with the mask. The optical insert is connected to the mask A by means of a single point of suspension as will be hereinafter described. The optical insert comprises essentially a nosepiece 10 comprising similar lateral members adapted to engage the sides of a wearer's nose adjacent to the bridge thereof, and is composed of soft, foamed material, such as foam rubber. This nosepiece 10 mounts integrally spectacle fames 12 adapted to receive ophthalmic or prescription glasses 13, and an adjustable mounting strap 14 which adjustably and removably interconnects the spectacle frames 12 to the face plate member of the gas mask A. It will be understood that the optical insert is an integrally molded assembly adapted to be connected to the gas mask A at a single point of suspension and can be adjusted with respect to the gas mask A to the satisfactory optical accommodation to the wearer, the gas mask A completely enclosing the insert in service, the latter interfering in no way with the operational service of the mask, while the adjustability of the insert with respect to the mask assures requisite optical corrections for the wearer. The connection and fixation of this insert with respect to the mask A is effected through the provision of a flexible mounting or supporting strap 14, which is similar in its properties to the mask A and the remaining elements of the optical insert. While the parts of the insert are integral and are formed by unitarily molding the composition of the insert assembly, it will be understood that the details of the molding technique as applied to the production of the optical assembly are known to the art, and being dependent to a substantial extent on the particular composition of the flexible elastomeric material composing the insert assembly, but actually forming no part of the instant invention, such details need not be reviewed in the instant description, such being available readily to one skilled in the art.

As has been pointed out above, the parts of the optical insert are molded integrally as a single unit. Connection between the gas mask A and this optical insert is effected frontally of the mask by the connecting and supporting strap 14, one end of which is molded permanently in the nose structure 10 of the insert. An anchoring section 18 includes an upstanding anchoring tip 20. This tip 20 and the entire anchoring section or portion 18 are molded integrally in the nose structure 10 of the insert. The anchoring section 18 is continued at its opposite end into the supporting strap 14, this strap 14 being looped through a buckle element 22, as shown in FIG. 4, and passed through opening 16 in portion 18. The buckle element is provided with parallel slots for reception and passage of the flexible strap 14. The buckle 22 preferably is a part of a socket, or female, member 24 of a snap fastener assembly, the male member 26 of which interconnects with the socket member 24, being embedded permanently in the frontal or nose element D of the gas mask A. Additionally, the strap 14 is slotted, as is designated at 30, for receiving the threaded stem of an adjusting stud 32, the head element of which seats on the substantially flat length portion 34 of the strap 14, which section complementally overlies a similar flat length or portion 31 of the strap which is passed through the opening 16 and in which the stem or shank of the stud 32 is received through the slot 30, and is assured adjustably in this slot by a nut 33 threadedly mounted on the stem of the stud. Relative vertical adjustability between the mask A and the flexible strap 14 thereby is attained, resulting in requisite vertical adjustment of the entire optical insert relative to the mask A to fulfill the optical requirements of the wearer.

This construction permits the greatest amount of adjusting movements without interference from the mask. The single point suspension between the mask A and the optical insert which is effected by the buckle 22 and the strap 14 passing therethrough has the effect of producing a universal type of connecting joint because of the combined rotatability of the fastener and the flexibility of the strap.

As has been noted above, the flexible strap 14 is molded integrally with the laterally extending nosepiece elements 10, which in turn define integral mounting elements which position the lens frames 12 close to the wearer's eyes so that the prescription lenses 13 mounted in the frames 12 produce proper optical correction for the wearer. The lenses 13 are fitted into a deep channel 15 provided in the periphery of the frames 12 for retention of the lenses 13 in the frames without likelihood of accidental displacement of the lenses during service or in the folding of the mask for packaging when not in use.

It will be seen also that the only connection between the mask A and the entire optical insert is the fastener and buckle assembly, and while the fastener structure is illustrated as being a snap fastener device, it will be apparent that many other different fastening instrumentalities may be employed, it being required only that one element thereof be united directly to the nose element of the gas mask A. Since the insert in its entirety is stabilized against lateral movement by its anchorage on the bridge of a wearer's nose through the nosepiece 10 and the laterally fitting nose pads 38 which are molded integrally with the lens frames 12, and yieldably seat against opposite sides of the wearer's nose, the vertical adjustment of the optical insert which is effectuable through appropriate adjustment of the stud 32 with respect to the slot 30 and corresponding movement of the strip 14 with respect to the buckle 22, is the only adjusting manipulation of the insert which is required, and such may be accomplished quickly and easily for placing the gas mask and insert into service. Additionally, the buckle 22 affords enhanced stability for the insert because the supporting strip 14 is rigidly reinforced throughout the length of the buckle. While the foregoing is true, it may be noted that the insert is turnable to some extent on the fixed member 26 of the fastening device. In practice, this turnability is limited to an arc of approximately 20°, which limitation is effected by the mounting of the snap fastener and buckle in a recess 28 in the nosepiece D of the mask A and the engagement of the looped portion of the strap 14 with opposite sides of such recess or depression 28 which, as is shown, lies behind the nosepiece D of the mask.

While the foregoing description and the accompanying drawings disclose in detail a preferred illustrative embodiment of the instant invention wherein an optical insert for a type of gas mask usable either for military or commercial purposes is mounted entirely within the confines of the mask at only a single point of connection to the mask while enabling requisite adjustment of the insert relative to the mask and the face of a wearer of the mask so as to effect needed optical corrections for the eyes of the wearer, it will be evident that the structural details of the single connecting instrumentalities may be varied as will become apparent to one skilled in the art without departing from the substance of the invention, and, accordingly, it will be understood that it is intended and desired to embrace and include within the scope of the invention such modifications and changes as may become necessary or desired to adapt the invention to varying conditions and uses, as defined by the appended claims.

I claim:

1. A gas mask for protectively enclosing the face of a wearer and composed of flexible material enabling the mask to be folded tightly for packaging and storing and to be extended therefrom for hermetically sealing the face of the wearer during service, the mask having spaced window openings sealed with transparent window material enabling viewing therethrough, a nosepiece intermediate the windows and having a recess behind the nosepiece and means enabling respiration through the mask, the said mask being spaced before and away from the face of the wearer when in service, and an optical insert mounted entirely within the confines of the mask and within the space between the mask and face of the wearer, the optical insert having a flexibility substantially equal to that of the mask and comprising an integral assembly including spaced spectacle frames, prescription lenses mounted in the spectacle frames, a resilient cushioning nosepiece having a bridging portion fitting over the bridge portion of the nose of the wearer and extensions projecting laterally therefrom on both sides of the nose, the said extensions integrally carrying the spectacle frames and corrective lenses therein closely adjacent to the eyes of the wearer for visual correction thereof, flexible suspension means for the frames and lenses connected to the resilient cushioning nosepiece of the insert, fastening means securing the suspension means to the nosepiece of the mask interiorly thereof, and means enabling vertical adjustment of the suspension means relative to the mask for adjusting the optical insert with respect to the eyes of the wearer for correctively positioning the prescription lenses relative to the eyes of the wearer, the said fastening means being the only connection between the optical insert and the mask, the suspension means comprising a flexible strap having an end portion integrally united with the cushioning nosepiece of the insert, the said fastening means securing the strap to the mask including a buckle through which the strap is looped, a snap fastener having a first element integrally embedded in the mask, and a socket element receiving the first element, the buckle being a portion of the socket element, the strap having overlapping end portions with a stud fastener uniting the overlapping end portions, the stud fastener having a head portion seated on one of the overlapping end portions of the strap and a shank portion extending through a slot in an adjacent end portion of the strap enabling relative adjustment between the overlapping end portions, and a nut threadedly mounted on the shank portion of the stud fastener for locking and releasing the fastener with respect to the end portions of the strap for enabling longitudinal adjustment of the strap.

2. A gas mask and correctional optical insert therefor as claimed in claim 1, wherein the single connection between the gas mask and insert includes means enabling adjustable positioning of the insert with respect to the mask and face of a wearer for effecting requisite visual corrections by the lenses.

References Cited in the file of this patent

UNITED STATES PATENTS

| | | |
|---|---|---|
| 2,758,506 | McNeil | Aug. 14, 1956 |
| 2,877,464 | Lindblom | Mar. 17, 1959 |
| 2,905,172 | Rodenhouse | Sept. 22, 1959 |
| 2,951,418 | Bitner | Sept. 6, 1960 |